(12) United States Patent
Lincoln et al.

(10) Patent No.: US 12,298,027 B2
(45) Date of Patent: May 13, 2025

(54) CHAMBERLESS WIDE AREA DUCT SMOKE DETECTOR

(71) Applicant: Carrier Corporation, Palm Beach Gardens, FL (US)

(72) Inventors: David L. Lincoln, Cromwell, CT (US); Marcin Piech, East Hampton, CT (US); Slade R. Culp, Coventry, CT (US); Joseph Anthony Vidulich, Englewood, FL (US); Rick Wolf, Sarasota, FL (US); Michael J. Birnkrant, Wethersfield, CT (US); Michael T. Gorski, Clinton, CT (US); Kyle Aaron, Torrington, CT (US); Devis Dishnica, Oakville, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 134 days.

(21) Appl. No.: 17/956,335

(22) Filed: Sep. 29, 2022

(65) Prior Publication Data
US 2023/0028619 A1    Jan. 26, 2023

Related U.S. Application Data

(62) Division of application No. 16/819,442, filed on Mar. 16, 2020, now Pat. No. 11,493,229.
(Continued)

(51) Int. Cl.
*F24F 13/00*   (2006.01)
*G01N 15/06*   (2006.01)
(Continued)

(52) U.S. Cl.
CPC ............ *F24F 13/00* (2013.01); *G01N 15/06* (2013.01); *F24F 2110/64* (2018.01); *G01N 15/075* (2024.01)

(58) Field of Classification Search
CPC . C12Q 1/6883; C12Q 2600/136; F24F 13/00; F24F 2110/64; G01N 15/06;
(Continued)

(56) References Cited

U.S. PATENT DOCUMENTS 4,017,193 A    4/1977   Loiterman
5,844,148 A *  12/1998  Klein .................... G01N 1/2226
                                                       73/864.81
(Continued)

FOREIGN PATENT DOCUMENTS

CN        204134945 U    2/2015
CN        204423580 U    6/2015
(Continued)

OTHER PUBLICATIONS

"Nodon Presents Eye—World's First Smoke Sensor to Take CES Innovation Award"; Z-Wave Alliance; 2018; 4 pages; https://z-wavealliance.org/5771-2/.
(Continued)

*Primary Examiner* — Tri T Ton
(74) *Attorney, Agent, or Firm* — CANTOR COLBURN LLP

(57) ABSTRACT

A detector assembly for a duct of a heating ventilation and air conditioning system includes an outer housing having at least one through hole formed therein, an inner sampling support receivable within a hollow interior of the outer housing, and at least one detector mounted to the inner sampling support. The at least one detector is axially aligned with the at least one through hole when the inner sampling support is installed within the hollow interior of the outer housing. The at least one detector is operable to sample air within the duct to detect a hazardous condition.

6 Claims, 8 Drawing Sheets

Related U.S. Application Data

(60) Provisional application No. 62/821,128, filed on Mar. 20, 2019.

(51) Int. Cl.
 *F24F 110/64* (2018.01)
 *G01N 15/075* (2024.01)

(58) Field of Classification Search
 CPC .............. G01N 15/075; G01N 2500/00; G01N 2800/202; G01N 2800/50; G01N 33/6893; G01N 2015/0693; G08B 17/10; G08B 17/103; Y02B 30/70
 See application file for complete search history.

(56) References Cited

U.S. PATENT DOCUMENTS

| | | |
|---|---|---|
| 7,738,098 B2 | 6/2010 | Cole |
| 7,928,854 B2 | 4/2011 | Martino |
| 8,705,038 B2 | 4/2014 | Farley et al. |
| 8,899,097 B2 | 12/2014 | Wu |
| 8,934,101 B2 | 1/2015 | Ido et al. |
| 9,448,168 B2 | 9/2016 | Knox et al. |
| 9,459,208 B2 | 10/2016 | Orsini et al. |
| 9,666,048 B2 | 5/2017 | Fischer et al. |
| 9,905,102 B2 | 2/2018 | Fischer |
| 10,037,665 B2 | 7/2018 | Zribi et al. |
| 10,041,877 B2 | 8/2018 | Erdtmann |
| 2008/0022753 A1* | 1/2008 | MacPherson ........ G01N 1/2247 73/863.33 |
| 2009/0072835 A1* | 3/2009 | Dorwarth ................ D06F 34/22 324/448 |
| 2012/0120399 A1 | 5/2012 | Farley et al. |
| 2013/0239659 A1 | 9/2013 | Brighenti et al. |
| 2017/0206764 A1 | 7/2017 | Zribi et al. |
| 2018/0224373 A1 | 8/2018 | Lincoln et al. |
| 2018/0252654 A1 | 9/2018 | Lincoln et al. |
| 2019/0017717 A1* | 1/2019 | Urbaniak ................ F24F 11/30 |
| 2020/0300499 A1 | 9/2020 | Lincoln et al. |

FOREIGN PATENT DOCUMENTS

| | | |
|---|---|---|
| CN | 105606500 A | 5/2016 |
| CN | 105374154 B | 11/2017 |
| DE | 2844975 A1 | 4/1980 |
| EP | 0290412 A2 | 11/1988 |
| EP | 1039426 A2 | 9/2000 |
| EP | 2734988 B1 | 3/2016 |
| WO | 2012032359 A2 | 3/2012 |
| WO | 2018089477 A1 | 5/2018 |

OTHER PUBLICATIONS

"The System Sensor Innovair (TM) DH200 Low-Flow Series", HVAC Systems Monitoring—System Sensor, Jan. 31, 2003 (Jan. 31, 2003), XP055213074, US; retrieved from the Internet: URL: https://www.systemsensor.com/en-us/Documents/DH200RPL_DataSheet_A05-0353.pdf, Date Accessed Aug. 19, 2020.

Extended European Search Report; International Application No. 20164208.9-1206; International Filing Date: Mar. 19, 2020; Date of Mailing: Aug. 19, 2020; 114 pages.

International Fire Protection; "Apollo—Refining Fire Detection with New Soteria Dimension"; MDM Publishing LTD—RS; Mar. 15, 2018; 3 pages; https://ifpmag.mdmpublishing.com/apollo-refining-fire-detection-with-new-soteria-dimension/.

System Sensor; "Applications Guide: Duct Smoke Detectors"; 2015; 16 pages.

* cited by examiner

CHAMBERLESS WIDE AREA DUCT SMOKE DETECTOR

CROSS-REFERENCE TO RELATED APPLICATIONS

This application is a Division of U.S. Non-Provisional application Ser. No. 16/819,442, filed Mar. 16, 2020, which claims the benefit of U.S. Provisional Application Ser. No. 62/821,128, filed Mar. 20, 2019, the disclosure of which is incorporated herein by reference in its entirety.

BACKGROUND

Exemplary embodiments pertain to the art of indoor air quality sensors, smoke sensors, and more particularly to chamberless smoke and indoor air quality sensors for use in a duct of a heating, ventilation, and air conditioning system.

Detection systems are often installed in office buildings, airports, sports venues, retail stores and the like to identify smoke or chemicals for early warning of a threat event. As examples, systems may be designed to identify trace amounts of smoke particles as an early warning of a fire, trace amounts of target chemicals as an early warning of toxicity in an environment, or minute amounts of airborne substances.

Detectors for sensing one or more conditions within a duct of a heating, ventilation, and air conditioning system are typically mounted to a flange or other component and/or the outside of an air duct and include a sampling pipe which extends laterally into the duct from the exterior. The air within the duct flows into inlets formed in the sampling pipe to a smoke sensor, located in a housing outside of the duct. The air is then returned to the interior of the duct via an output flow pipe.

The sampling pipes used to direct air from inside the duct to a smoke detector have different lengths and different hole spacings based on the size of the duct. In addition, dust may accumulate within the chamber of the smoke detector resulting in false alarms and frequent maintenance. Maintenance of a duct detector is typically a time consuming procedure having limited effectiveness. As a result, maintenance of a duct detector often entails replacement of the detector.

BRIEF DESCRIPTION

According to an embodiment, a detector assembly for a duct of a heating ventilation and air conditioning system includes an outer housing having at least one through hole formed therein, an inner sampling support receivable within a hollow interior of the outer housing, and at least one detector mounted to the inner sampling support. The at least one detector is axially aligned with the at least one through hole when the inner sampling support is installed within the hollow interior of the outer housing. The at least one detector is operable to sample air within the duct to detect a hazardous condition.

In addition to one or more of the features described above, or as an alternative, in further embodiments the at least one detector is an optical detector including at least one light source and at least one light detecting device.

In addition to one or more of the features described above, or as an alternative, in further embodiments the inner sampling support further comprises: a tube body and a flange mounted to an end of the tube body.

In addition to one or more of the features described above, or as an alternative, in further embodiments the at least one detector is mounted to an exterior surface of the tube body.

In addition to one or more of the features described above, or as an alternative, in further embodiments the at least one detector is at least partially embedded within the tube body.

In addition to one or more of the features described above, or as an alternative, in further embodiments the tube body further comprises a plurality of segments connected together, each of the segments including at least one detector.

In addition to one or more of the features described above, or as an alternative, in further embodiments the inner sampling support includes one or more positioning flanges to limit at least one of vertical and lateral movement of the inner sampling support when installed within the hollow interior of the outer housing.

In addition to one or more of the features described above, or as an alternative, in further embodiments the outer housing further comprises a body defining the hollow interior and a flange located at a first end of the body.

In addition to one or more of the features described above, or as an alternative, in further embodiments the outer housing further comprises at least one cleaning mechanism mounted within the hollow interior of the body in axial alignment with the at least one detector.

In addition to one or more of the features described above, or as an alternative, in further embodiments when the inner sampling support is installed within the hollow interior of the outer housing, the inner sampling support is rotatable about an axis such that the at least one cleaning mechanism engages the at least one detector.

In addition to one or more of the features described above, or as an alternative, in further embodiments comprising an actuation mechanism coupled to the inner sampling support, wherein the actuation mechanism is operable to rotate the inner sampling support about the axis.

In addition to one or more of the features described above, or as an alternative, in further embodiments the at least one detector includes one or more light sources, one or more light sensing device, and a processing device operably coupled to the one or more light sources and the one or more light sensing device.

In addition to one or more of the features described above, or as an alternative, in further embodiments the at least one detector assembly includes a first detector and a second detector spaced along an axis of the inner sampling support.

In addition to one or more of the features described above, or as an alternative, in further embodiments a processing device of the first detector is also a processing device of the second detector.

According to another embodiment, a heating ventilation and air condition system includes a duct having a hollow interior and at least one detector assembly mounted to the duct. The at least one detector assembly includes an outer housing having at least one through hole formed therein, an inner sampling support mounted within the outer housing, and at least one detector mounted to the inner sampling support. The at least one detector is arranged in fluid communication with the hollow interior of the duct and is operable to detect a hazardous condition within the hollow interior of the duct.

In addition to one or more of the features described above, or as an alternative, in further embodiments the at least one detector assembly includes a plurality of detector assemblies mounted at intervals over an axial length of the duct.

In addition to one or more of the features described above, or as an alternative, in further embodiments wherein the at least one detector further comprises a plurality of detectors mounted at intervals over an axial length of the inner sampling support.

In addition to one or more of the features described above, or as an alternative, in further embodiments the inner sampling support further comprises a plurality of segments connected together and each of the plurality of segments including at least one detector.

In addition to one or more of the features described above, or as an alternative, in further embodiments the duct further comprises a sidewall and the outer housing further comprises a flange, the flange being mounted to the sidewall to attach the at least one detector assembly to the sidewall.

In addition to one or more of the features described above, or as an alternative, in further embodiments the at least one detector assembly extends within the hollow interior of the duct perpendicular to an axial length of the duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
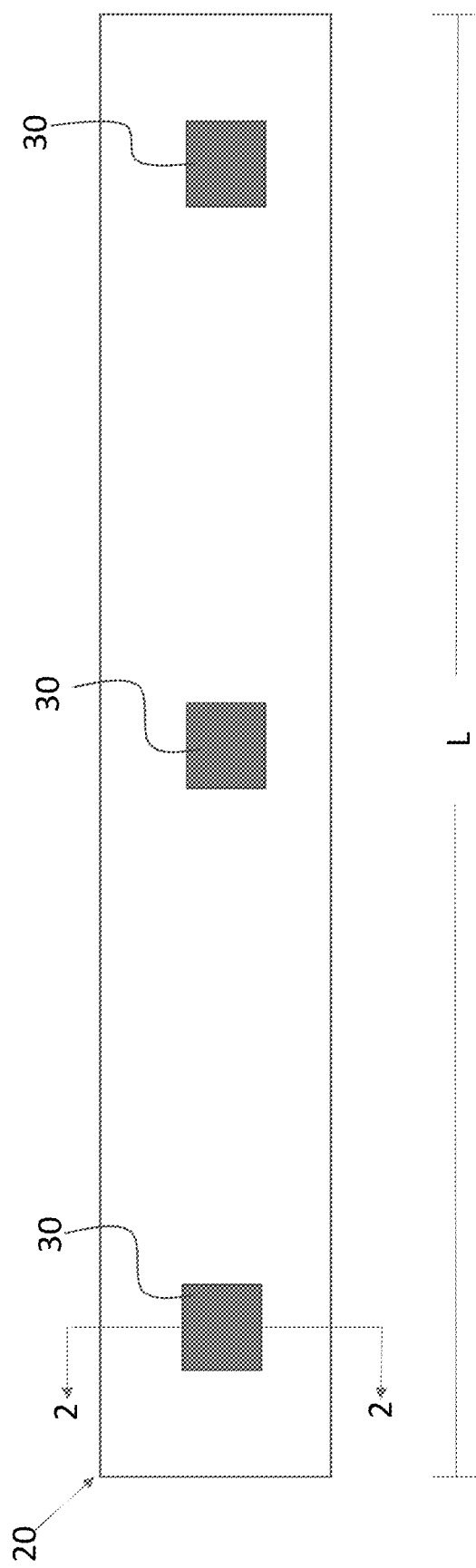
FIG. 1 is a side view of a duct of a heating, ventilation, and air conditioning system according to an embodiment.

With reference now to FIG. 1, an example of a duct 20 of a heating, ventilation, and air conditioning (HVAC) system is illustrated. As shown, one or more detector assemblies 30 are mounted to the duct 20. Each detector assembly 30 is operable to sample an area within the interior 22 (see FIG. 2) of the duct 20 to determine if particles representative of a hazardous condition are present. In the illustrated, non-limiting embodiment, a plurality of detector assemblies 30, for example three detector assemblies, are mounted at intervals spaced along the axial length L of the duct 20. However, it should be understood that a duct 20 having any number of detector assemblies 30 coupled thereto is within the scope of the disclosure. The total number of detector assemblies 30 will typically vary based on the overall length L of the duct 20 and the maximum allowable spacing between detector assemblies 30 as dictated by one or more building codes or regulations.

Figure 2:
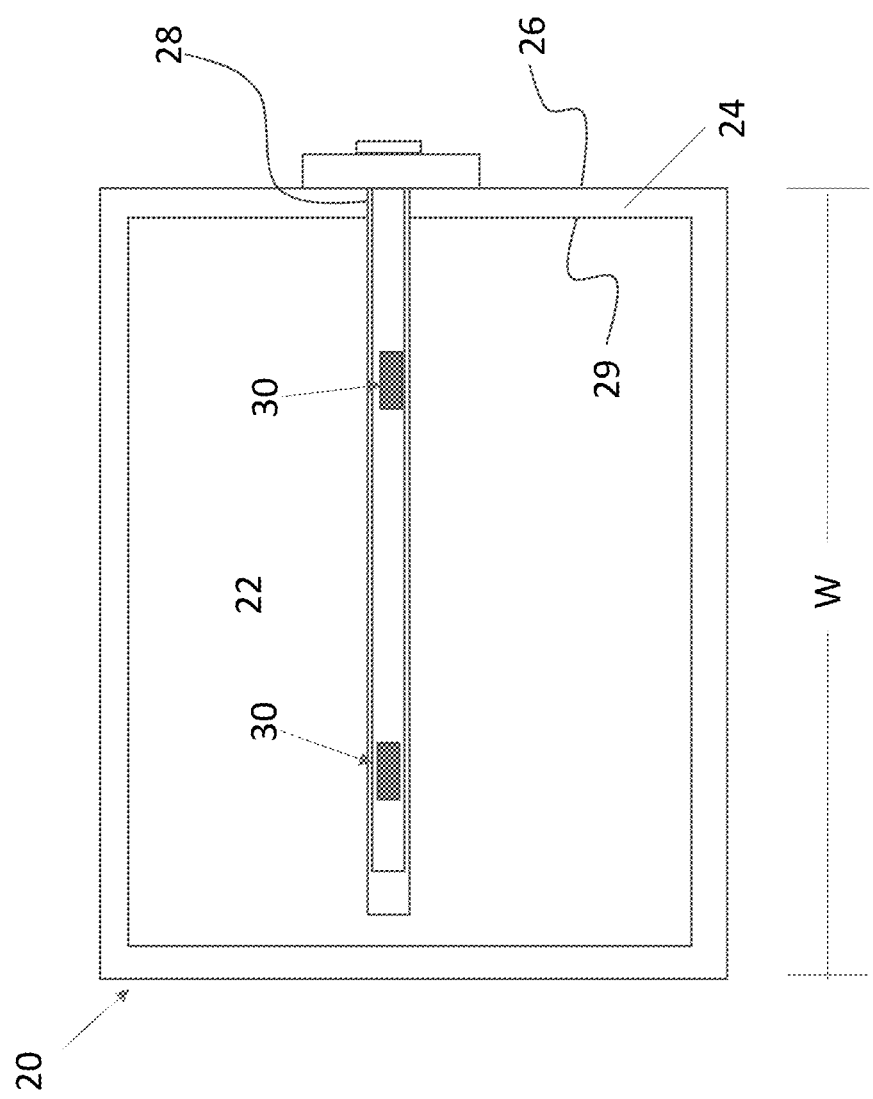
FIG. 2 is a cross-sectional view of the duct of FIG. 1 taken through a detector assembly according to an embodiment.

As best shown in FIG. 2, each of the detector assemblies 30 is affixed to a sidewall 24 of the duct 20 and extends from the sidewall 24 into the interior 22 of the duct 20, perpendicular to the axial length L of the duct 20. In the illustrated, non-limiting embodiment, the detector assemblies 30 are affixed to an exterior surface 26 of the sidewall 24, and extend through an opening 28 formed therein. However, embodiments where the detector assembly 30 is mounted to an interior surface 29 of the sidewall 24 are also contemplated herein. In addition, embodiments where a detector assembly 30 extends parallel to the axial length L of the duct 20 are also contemplated herein. In such embodiments, one or more detector assemblies 30 may be spaced over a width W of the duct 20.

Figure 3:
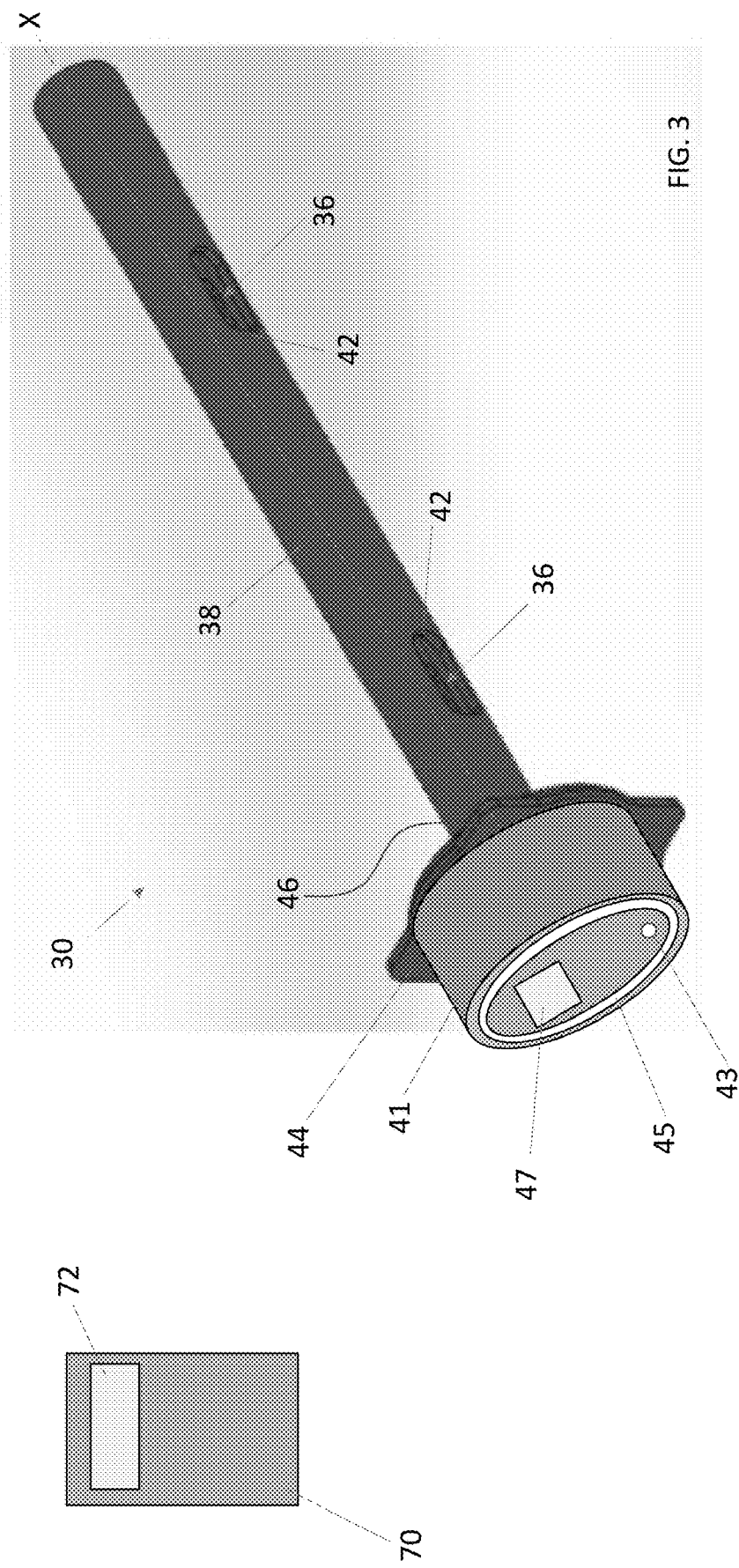
FIG. 3 is a perspective view of a detector assembly according to an embodiment.
Figure 4:
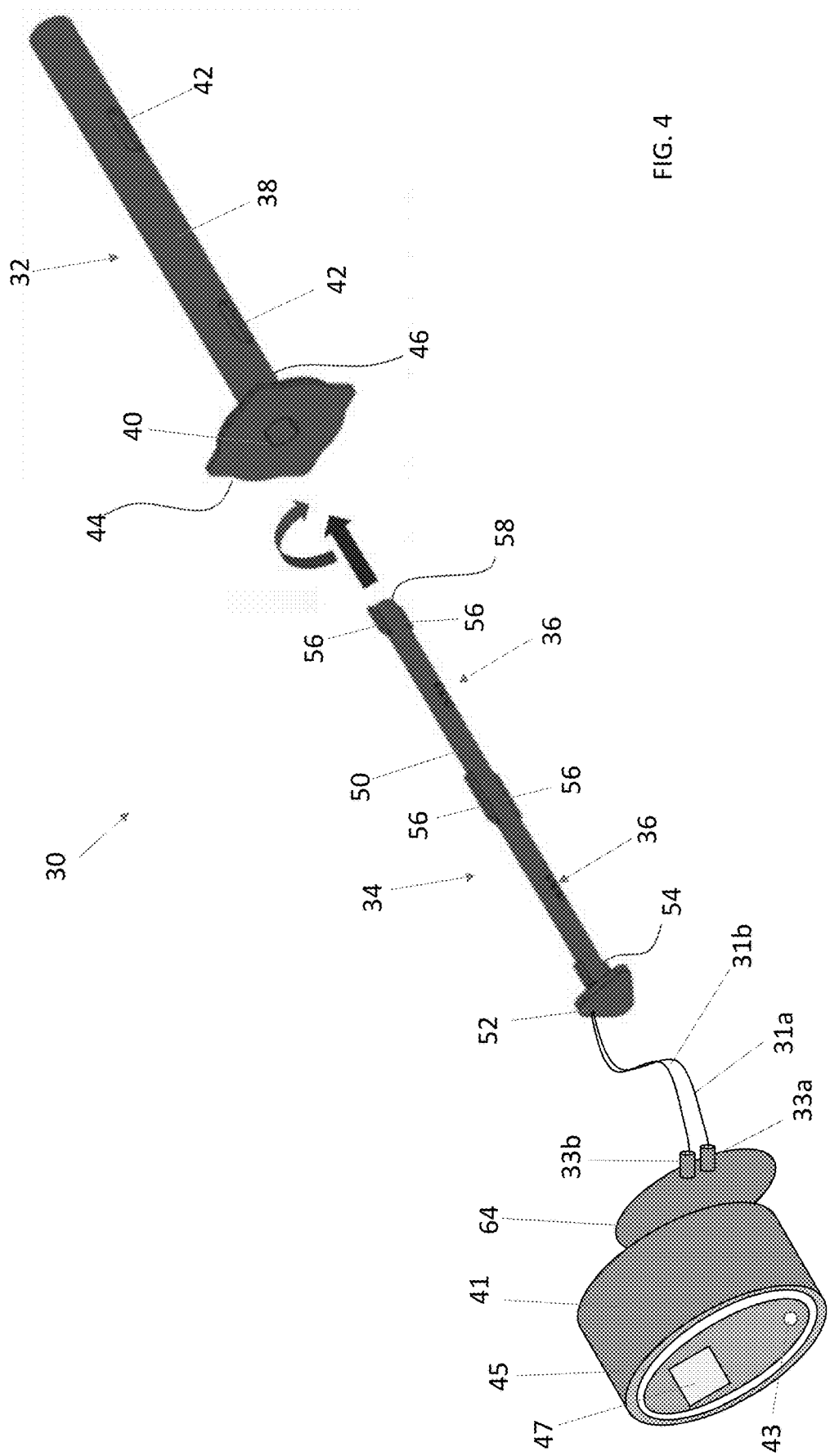
FIG. 4 is an exploded perspective view a detector assembly according to an embodiment.
Figure 5:
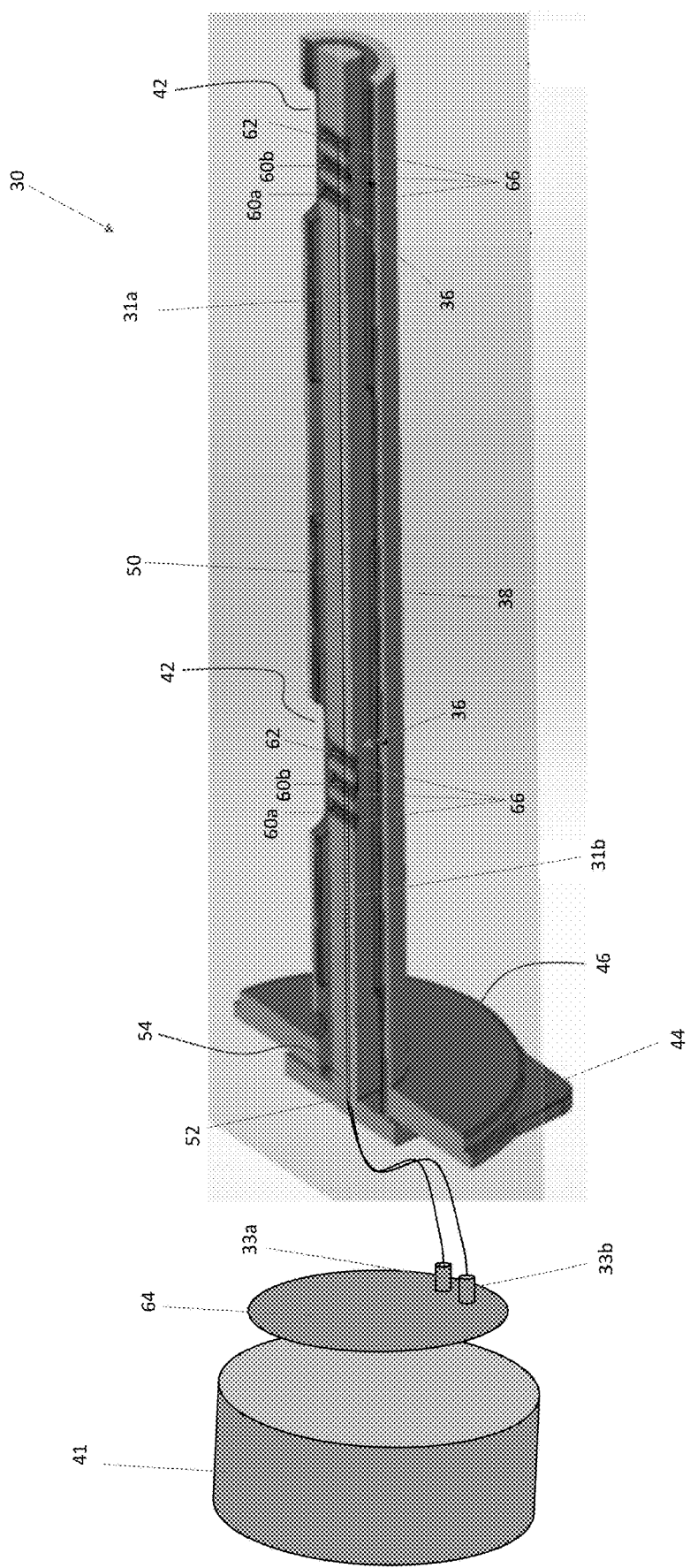
FIG. 5 is a cross-sectional view of a detector assembly according to an embodiment.

With reference now to FIGS. 3-5, an example of a detector assembly 30 suitable for use within a duct 20 is illustrated in more detail. The detector assembly 30 generally includes an outer cover 41, outer housing 32 (FIG. 4), an inner sampling support 34 (FIG. 4) receivable within the outer housing 32, and one or more detectors 36. The outer cover 41 may contain one or more visual indicators such as an LED 43, an indicating light ring 45, a local display 47, or any combination thereof. The outer housing 32 includes a conduit-like body 38 having a generally hollow interior 40 (FIG. 4). In the illustrated, non-limiting embodiment, the body 38 of the outer housing 32 is generally cylindrical in shape; however, it should be understood that a body 38 having any suitable configuration, such as a rectangular shape for example, is also within the scope of the disclosure. The hollow interior 40 may have a shape complementary to the exterior of the body 38, or alternatively, may have a contour distinct from the shape of the body 38.

One or more one through holes 42 are formed in the sidewall of the body 38. The total number of through holes 42 formed in the body 38 will depend on the overall length of the body 38 and the total number of detectors 36 associated with the detector assembly 30. In the illustrated, non-limiting embodiment, a mounting flange 44 is located at a first end 46 of the body 38 of the outer housing 32. The mounting flange 44 may be integrally formed with the body 38, or alternatively, may be affixed to the first end 46 via adhesive, fasteners, or any other suitable coupling mechanism. The flange 44 may be used to mount the outer housing 32 to the sidewall 24 of the duct 20. For example, as shown in FIG. 2, the mounting flange 44 may abut the exterior surface 26 of the sidewall 24 such that the body 38 of the outer housing 32 extends into the interior 22 of duct 20. However, other methods of mounting the outer housing 32 in fluid communication with the interior 22 of the duct 20 are contemplated herein. For example, the body 38 of the outer housing 32 may be mounted to the duct 20 via a simple temper fit, friction fit, a tightening nut, adhesive or any other suitable mechanism.

Referring to FIG. 4, the inner sampling support 34 includes a tube body 50 having an axial length generally equal to, or shorter than the axial length of the body 38 of the outer housing 32. As shown, the tube body 50 may be cylindrical in shape; however, other shapes are also within the scope of the disclosure. An outer flange 52 is positioned at the first end 54 of the tube body 50. The outer flange 52 has at least one dimension that is larger than a diameter of the hollow interior 40 of the body 38 of the outer housing 32. As a result, when the inner sampling support 34 is installed relative to the outer housing 32, a surface of the outer flange 52 abuts a corresponding surface of the mounting flange 44. Further, when the inner sampling support 34 is mounted within the outer housing 32, the inner sampling support 34 and the outer housing 32 may be arranged generally concentrically about an axis X defined by the body 38 of the outer housing 32. However, in other embodiments, the inner sampling support 34 and the outer housing 32 may not be concentric with one another. For example, in an embodiment, the inner sampling support 34 and the outer housing 32 are not mounted concentrically when cam-type operation is intended. The phrase "cam-type operation" as used herein is intended to include embodiments where the axis defined by the inner sampling support 34 is offset from the axis of the outer housing 32 or where the contour (i.e. the radius) of either the inner sampling support 34 or the outer housing 32 varies about the circumference thereof. In such embodiments, rotation of the inner sampling support 34 is non-uniform relative to outer housing 32.

The positioning of the inner sampling tube 34 and the contour of the outside of the body 38 of the outer housing 32 may be oriented to achieve a nearly continuous surface along the outer housing 32. Simulations of the velocity contours around a cylindrical-shaped tube in the duct for both low velocity (100 ft$^3$/min) and high velocity (4000 ft$^3$/min) air flows have been performed. These simulations indicate that self-cleaning of the detector assembly 30, to be described in more detail below, is most efficient when the detectors 36 are appropriately positioned relative to the direction of the airflow through the duct 20. In an embodiment, the detectors 36 are mounted at angular position between 45° and 85° relative to the airflow direction in order to maximize the self-cleaning effect. At these angular positions, the air velocity at the surface of the outer housing 32 is the greatest. Accordingly, the contour of the outer housing 32 can be modified to have a non-circular cross-section, e.g. oval or airfoil shape, to increase the airflow velocity at specific locations on the outer housing 32, where the detectors 36 would be located, to increase cleaning efficiency.

With continued reference to FIG. 4, one or more positioning flanges 56 extend radially outwardly from an exterior surface of a portion of the tube body 50 receivable within the hollow interior 40 of the body 38 of the outer housing 32. As shown, these positioning flanges 56 may be arranged in pairs extending in radially opposite directions at a location of the tube body 50. However, embodiments where only a single positioning flange 56, or more than two positioning flanges 56 are arranged at an axial location of the tube body 50 are also within the scope of the disclosure. Each positioning flange 56 is sized to engage a corresponding surface (not shown) defining the hollow interior 40 of the body 38, thereby limiting vertical and lateral movement of the inner sampling support 34 within the outer housing 32. In the illustrated, non-limiting embodiment, the tube body 50 includes a first pair of positioning flanges 56 arranged near a midpoint of the axial length of the tube body 50, and a second pair of positioning flanges 56 adjacent a second end 58 of the tube body 50. The total number of positioning flanges 56 may vary based on a length of the inner sampling support 34 and the number of detectors 36 associated with the detector assembly 30.

As previously noted, one or more detectors 36 are associated with the detector assembly 30, such as mounted to or embedded within the tube body 50 of the inner sampling support 34. The term "detector" as used herein may include, but is not limited to, smoke detectors or indoor air quality sensors that are capable of detecting small amounts of particulate (e.g. smoke particles, dust, steam, or other particulates), chemicals, and/or biological agents. Example types of detectors may include ionization detectors, photoelectric aspirating detectors, photoelectric chamber or chamber-less detectors, and combinations thereof.

In the illustrated, non-limiting embodiment shown in FIGS. 3-5, the detector assembly 30 includes two detectors 36 spaced apart from one another over the axial length of tube body 50 of the inner sampling support 34. Each detector 36 is positioned at an axial length of the tube body 50 such that when the inner sampling support 34 is installed within the hollow interior 40 of the body 38 of the outer housing 32, the detector 36 is aligned with a corresponding through hole 42 formed in the outer housing 32. As a result, each detector 36 is arranged in fluid communication with the area of the duct 20 surrounding the outer housing 32. Although two detectors 36 are shown, in should be understood that embodiments having only a single detector 36, or alternatively, embodiments having more than two detectors 36 are also within the scope of the disclosure. In embodiments of the detector assembly 30 including a plurality of detectors 36, the detectors may, but need not have substantially similar configurations to each other. Further, a detector assembly 30 may include a plurality of modules or segments connected together such as via a fastening mechanism, for example interlocking threads, fasteners, or adhesive. Each segment of the detector assembly 30 may have a predefined length and a number of detectors 36 associated therewith. As a result, various segments may be combined to achieve a detector assembly 30 having a desired configuration.

Figure 6:
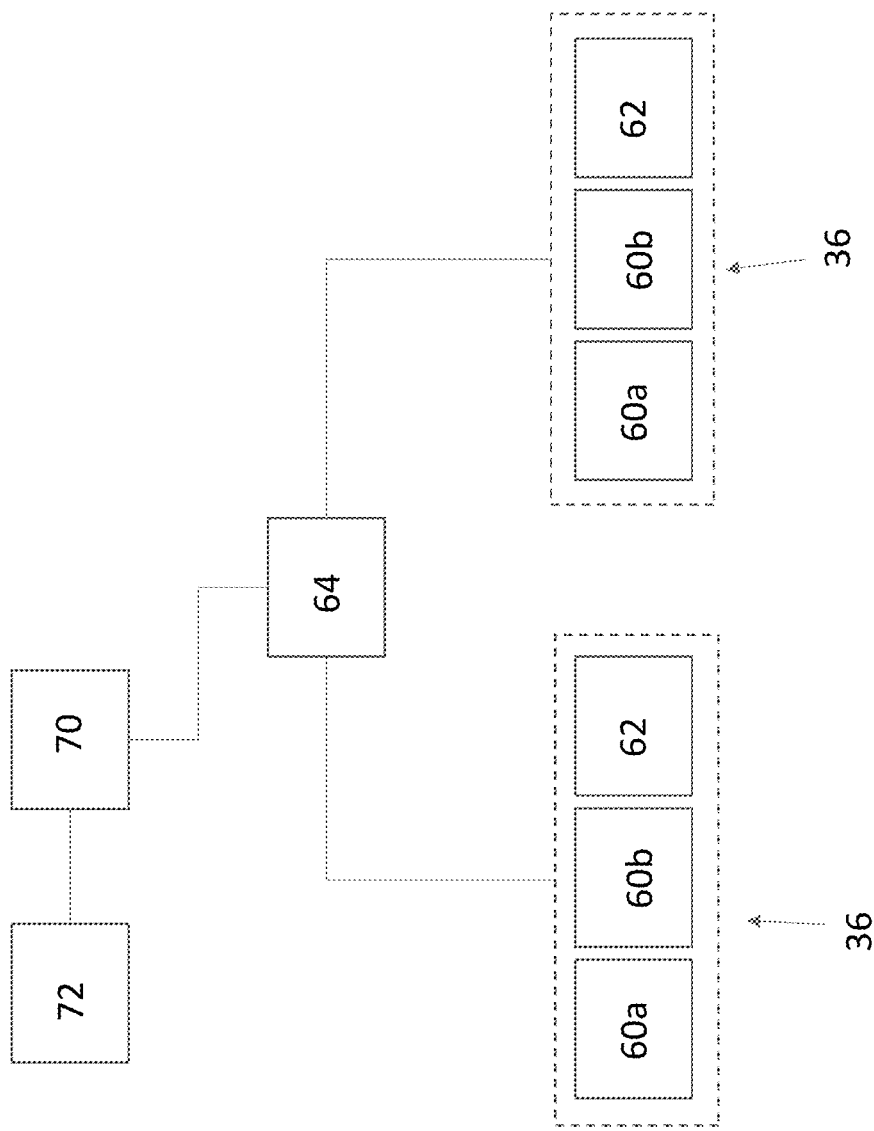
FIG. 6 is a schematic diagram of a detector assembly according to an embodiment.

Referring now to FIG. 6, an example of a detector 36 is illustrated in more detail. As shown, the detector 36 is an optical detector that uses light to evaluate an adjacent area, hereinafter referred to as a "monitored space" for the presence of one or more conditions. In this example, the monitored space is a portion of the interior 22 of a duct 20 (Shown in FIG. 2), such as of an HVAC system for example. When the light encounters an object, such as a smoke particle, or gas molecule for example, the light is scattered and/or absorbed due to a difference in the refractive index of the particle compared to the surrounding medium (air). Observing any changes in the incident light can provide information about the monitored space including determining the presence of a condition or event.

Each detector 36 includes one or more light sources 60 and one or more light sensing devices 62 and a processing device 64. In an embodiment, the one or more light sources 60 include a first light source 60a and a second light source 60b. The light sources 60a, 60b may include a light emitting diode (LED) or laser operable to emit a light beam at a wavelength or over a range of wavelengths into the monitored space. In an embodiment, the first light source 60a may emit light having a wavelength characteristic of infrared light and the second light source 60b may emit light have a wavelength characteristic of blue visible light. In such embodiments, the infrared light may be used in the detection and false alarm discrimination of smoke. Similarly, the blue visible light may be used in the false alarm discrimination of smoke. Additionally, in some embodiments, the combination of infrared light and visible light may be used to determine the size of particles at or near the detector 36 within the monitored space.

The one or more light sensing devices 62 may include photodiodes, bipolar phototransistors, photosensitive field-effect transistors, photodetectors, and the like. Although only a single light sensing device 62 is shown FIGS. 3-6, in other embodiments, the detector 36 may include a plurality of light sensing devices 62, such as two, three, four, or any number of light sensing devices. The light sensing device 62 is operable to emit sensor signals in response to interaction of a light beam emitted by a light source 60 of the detector 36 with one or more particles in the monitored space. The light sensing device 62 generates a signal in response to receiving scattered light resulting from the interaction between the emitted light beam and a particle. The signals generated are proportional to the intensity of the scattered light received by the light sensing device 62.

With reference again to FIG. 5 and continued reference to FIG. 6, in the illustrated, non-limiting embodiment, a plurality of channels 66 are formed in the tube body 50, and each of the at least one light source 60 and at least one light sensing device 62 is mounted within a respective channel 66. However, in other embodiments, a single channel 66 may be formed in the tube body 50, and the one or more light sources 60 and/or the one or more light sensing devices 62 of a detector 36 may be mounted within the channel 66. The at least one light source 60 is mounted such that light is emitted therefrom radially outwardly, toward the monitored space. Similarly, each of the one or more light sensing devices 62 is positioned such that the portion of the at least one light sensing device 62 configured to receive a light signal is also facing the monitored space.

The light emitted from each of the light sources 60 defines an emitter cone increasing in diameter away from the surface of the detector assembly 30. In embodiments including a plurality of light sources 60, the emitter cones formed by each light source 60 may be oriented at any angle to one another. Any suitable angle between the emitter cones is within the scope of the disclosure. The at least one light sensing device 62 similarly defines a receiving cone associated therewith. The volume where each emitter cone overlaps with the receiving cone is defined as a sensing volume. For example a first sensing volume is defined between the first emitter cone and the receiving cone and a second sensing volume is defined between the second emitter cone and the receiving cone. The one or more light sensing devices 62 are configured to measure signals from the one or more light sources 60 within each sensing volume. In an embodiment, the one or more light sources 60, and the one or more light sensing devices 62 may be packaged into a pre-formed assembly or module. In such embodiments, each module may be easily mountable as a whole to the inner sampling support 34 (shown in FIG. 4).

A processing device 64, such as a printed circuit board containing signal conditioning circuits (not shown), analog to digital conversion circuits (not shown), microprocessor (not shown) and memory (not shown), is arranged in electrical communication with the detectors 36, and specifically with at least one light source 60 and the at least one light sensing device 62. In an embodiment, best shown in FIGS. 4 and 5, the one or more detectors 36 are connected with one or more wires 31*a*, 31*b* terminated with one or more connectors 33*a*, 33*b*. The connectors 33*a*, 33*b* are in turn attached to at least one processing electronics device 64. Furthermore, the processing electronics device 64 may be powered by an internal battery (not shown) or externally, for example, by a fire panel 70 (FIG. 3) or other suitable source of electrical energy.

The purpose of the processing electronics device 64 is to supply power and control the operation of the detectors 36, and to process the signals from the detectors 36. In an embodiment, the processing device 64 is configured to control operation of the at least one light source 60 with regard to Off/On, varying light intensity (power or energy density), varying light wavelength, and/or varying pulse frequency. As an example, the processing device 64 may be used to alter a wavelength of the light beam emitted by a light source 60 in a controlled manner. Moreover, at each wavelength, the light intensity and/or pulse frequency can be varied in a controlled manner.

The processing device 64 typically includes a memory (not shown) capable of storing executable instructions. The executable instructions may be stored or organized in any manner and at any level of abstraction, such as in connection with one or more applications, processor, or routines, to analyze the signals detected by the plurality of sensors to make alarm decisions after preset threshold levels are reached according to the method described herein. In embodiments where the detector assembly 30 includes a plurality of detectors 36, a single processing device 64 may be connected to the light source 60 and light sensing device 62 of multiple detectors 36. Alternatively, a distinct processing device 64 may be associated with each detector 36.

In an embodiment, the processing electronics device may be operable to communicate the processed data to another element of the detection system 20, such as an indicator device for example. Examples of an indicator device include, but are not limited to, a local LED indicator 43, a local indicator light ring 45, a local display 47, and/or a remote display 72 (FIG. 3) associated with the fire panel 70, and/or other suitable remote displays or indicators (not shown). The information displayed may indicate a safe condition of a duct, for example by illuminating the LED indicator 43 or the indicator light ring 45 with a first color, such as green. Alternatively, the information displayed may be indicative of alarm or unsafe condition. In such instances, the LED indicator 43 or the indicator light ring 45 may be illuminated with a second color, for example red. Similarly, the information on the local or the remote display 47, 72 may indicate the type of particles that have been detected. In an embodiment, a text message identifying the type of particles observed, such as 'SMOKE' or 'PARTICULATES' may be displayed. Further, in some embodiments, a concentration levels of the particles detected may also be displayed.

Figure 7:
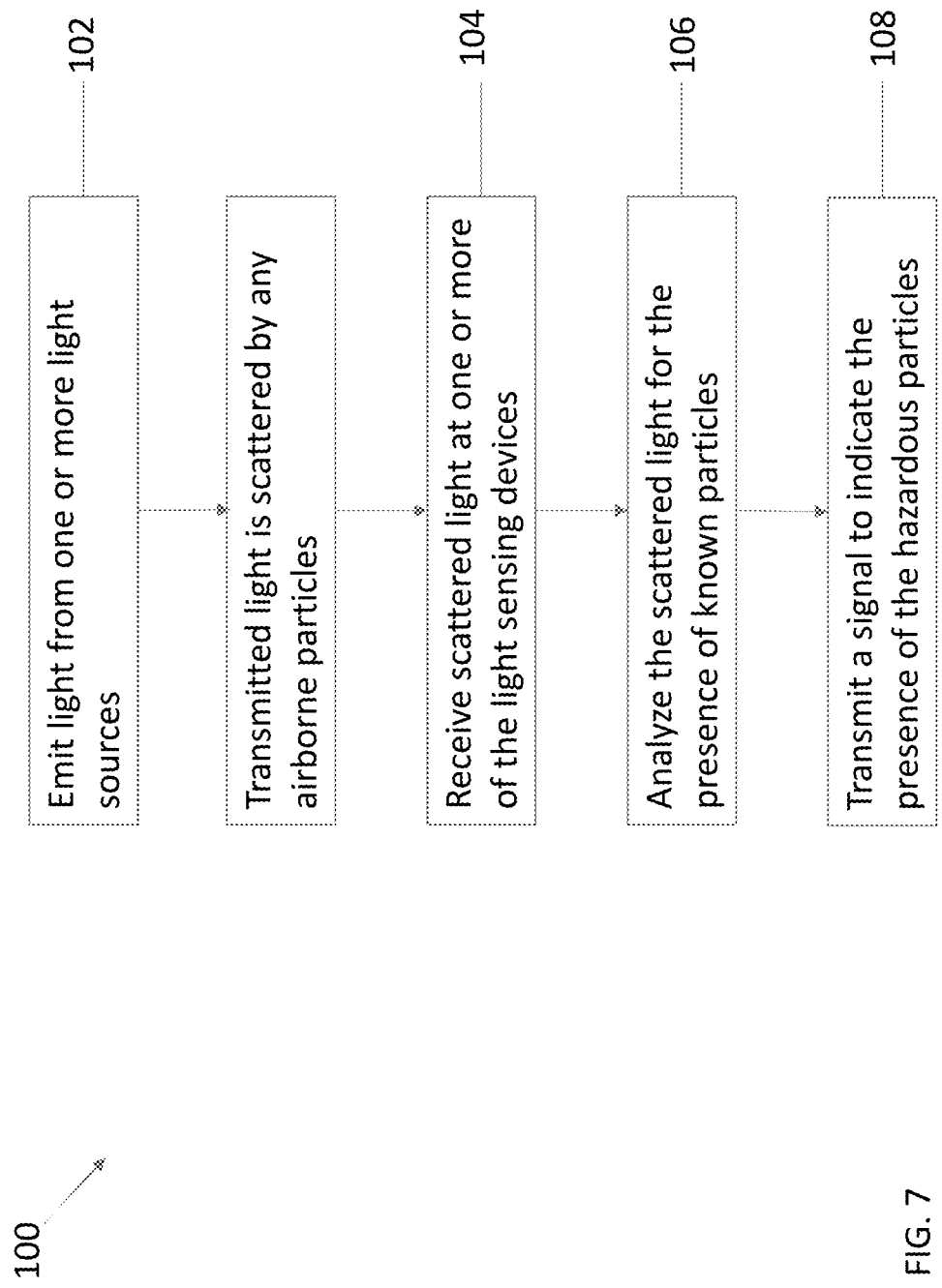
FIG. 7 is a method of operation of a detector assembly according to an embodiment.

Referring now to FIG. 7, a method 100 of operating a detector 36 of the detector assembly 30 to monitor air quality and/or detect particles indicative of a hazardous condition, such as a fire for example, is illustrated. At block 102, the processing device 64 communicates with at least one light source 60 such that light is transmitted therefrom, for example in an ultraviolet, infrared, or blue visible spectrum. The transmitted light is scattered by any airborne particles in the path of the transmitted light. The scattered light is received at one or more of the light sensing devices 62 of the detector 36 at block 104. At block 106, the processing device 64 is utilized to analyze the scattered light received at the light sensing devices 62 for the presence of one or more particles, such as smoke, gas, or other contaminants for example. In an embodiment, upon determining that one or more hazardous particles are present, the processing device 64 may transmit a signal to a building management system, fire panel 70, and/or an input/output devices such as local LED indicator 43, local light ring 45, local display 47 and/or other remote devices to indicate the presence of the hazardous particles, and in some embodiments, the type of particle detected, as shown at block 108.

Figure 8:
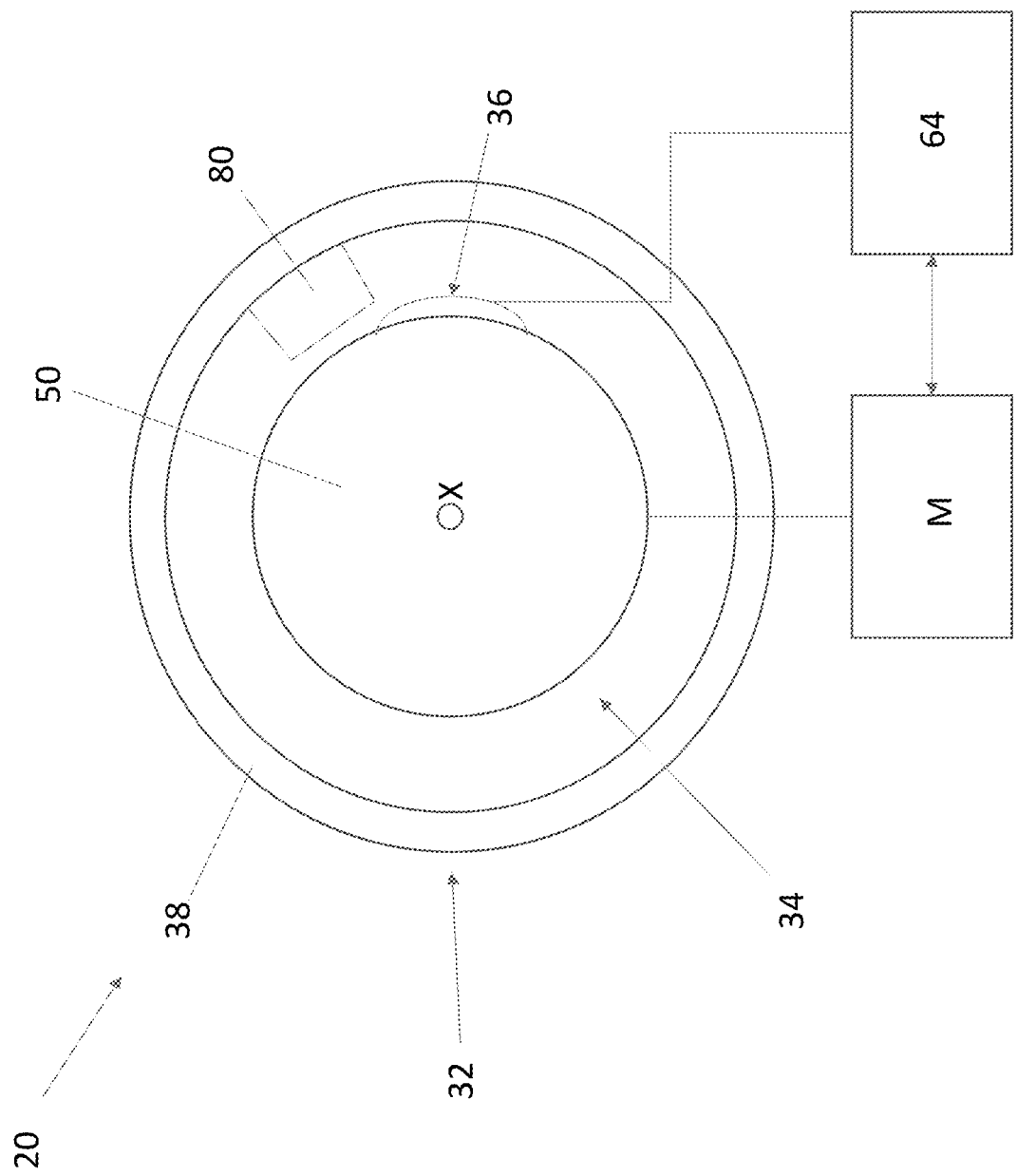
FIG. 8 is a cross-sectional view of a detector assembly according to another embodiment.

In an embodiment, best shown in FIG. 8, a cleaning mechanism 80 may be mounted to an interior surface of the body 38 of the outer housing 32 in axial alignment with each detector 36 of the detector assembly 30. The cleaning mechanism 80 may include a cloth-like material, bristles, or any other suitable mechanism configured to remove dust or debris from a surface via engagement with the surface. When the inner sampling support 34 is installed within the hollow interior 40 (FIG. 4) of the body 38 of the outer housing 32, the inner sampling support 34 may be rotatable about a central axis X of the inner sampling support 34 and outer housing 32. By rotating the inner sampling support 34 in a first direction about the axis X, the one or more detectors 36 are moved into engagement with the cleaning mechanism 80. Accordingly, as the inner sampling support 34 rotates about the axis X relative to the outer housing 32, the one or more light sources 60 and light sensing devices 62 of a detector 36 engage the cleaning mechanism 80 such that dust or other debris accumulated on the light sources 60 and light sensing devices 62 is removed. This rotation of the inner sampling support 34 may be performed manually, or alternatively, may be driven by an actuator M, for example in response to a signal from the processing device 64. In an embodiment, the actuator M may initiate a cleaning operation (i.e. rotation of the inner sampling support 34) in response to detection of a dust particle by the detector 36. Alternatively, the actuator M may be controlled to automatically perform a cleaning operation on a schedule, such as a predefined number of hours, days, weeks, or months for example.

A detector assembly 30 as illustrated and described herein has a reduced likelihood of false alarms due to dust accumulation and condensation. Existing systems monitor a flow of air through the duct to determine whether one or more conditions is present. Because the detector assembly 30 is operable to detect a hazardous condition based on the presence of particles within the duct, rather than an airflow through the duct, the need to monitor and verify a pressure within the system is eliminated. Further, the detector assembly 30 may be formed by connecting multiple segments, each having a predefined length and number of detectors 36 associated therewith. As a result, the segments of a detector assembly 30 do not need to be uniquely fabricated for each application.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating ventilation and air condition system comprising:
   a duct having a hollow interior;
   at least one detector assembly mounted to the duct, the at least one detector assembly including:
      an outer housing having at least one through hole formed therein;
      an inner sampling support slidably receivable within the outer housing, the inner sampling support being rotatable relative to the outer housing when received within the outer housing; and
      at least one detector mounted to the inner sampling support, the at least one detector being aligned with at least one through hole of the outer housing relative to a direction of flow through the duct when the inner sampling tube is installed within the outer housing, wherein the at least one detector is arranged in fluid communication with the hollow interior of the duct and is operable to detect a hazardous condition within the hollow interior of the duct.

2. The heating ventilation and air condition system of claim 1, wherein the at least one detector assembly includes a plurality of detector assemblies mounted at intervals over an axial length of the duct.

3. The heating ventilation and air condition system of claim 1, wherein the at least one detector further comprises a plurality of detectors mounted at intervals over an axial length of the inner sampling support.

4. The heating ventilation and air condition system of claim 3, wherein the inner sampling support further comprises a plurality of segments connected together and each of the plurality of segments including at least one detector.

5. The heating ventilation and air condition system of claim 1, wherein the duct further comprises a sidewall and the outer housing further comprises a flange, the flange being mounted to the sidewall to attach the at least one detector assembly to the sidewall.

6. The heating ventilation and air condition system of claim 1, wherein the at least one detector assembly extends within the hollow interior of the duct perpendicular to an axial length of the duct.

* * * * *